United States Patent [19]

Darcy et al.

[11] 4,248,051
[45] Feb. 3, 1981

[54] SYSTEM AND METHOD FOR CONTROLLING AIR CONDITIONING SYSTEMS

[76] Inventors: Jon J. Darcy, 125 Lexington Ave., Westwood, N.J. 07675; Richard A. Angerame, 23 Downing Pl., Harrington Park, N.J. 07640; Aaron R. Kramer, 15 Sutton Rd., Monsey, N.Y. 10952

[21] Appl. No.: 89,587

[22] Filed: Oct. 29, 1979

[51] Int. Cl.³ .................. G05B 13/00; F25B 1/00
[52] U.S. Cl. .................. 62/115; 62/176 E; 62/209; 62/229; 165/28; 236/91 D
[58] Field of Search ......... 62/209, 228 R, 229; 236/91 D, 91 E; 165/28; 62/176 E, 176 R, 115

[56] References Cited
PUBLICATIONS

Computer Control in Process Industries, Lowe & Hidden, 1971, TJ213.L6, pp. 35-37.

Primary Examiner—William E. Wayner
Attorney, Agent, or Firm—Samuelson & Jacob

[57] ABSTRACT

A system and method for controlling a refrigeration unit of an air conditioning system operating in connection with a given building environment so as to establish conditions providing a desired comfort level within the building environment, the system and method being arranged to detect the output of the refrigeration unit, to detect changes in interior or exterior conditions which will affect the comfort level in the building environment and to provide at least one control signal in response to the detected output and conditions for operating the refrigeration unit, the control signal being compensated for the predetermined dynamic characteristics of the particular refrigeration unit and the predetermined dynamic characteristics of the particular building environment such that the control signal will anticipate further change in the conditions within the building environment and will operate the refrigeration unit so as to counter the anticipated further change and tend to maintain the desired comfort level.

23 Claims, 3 Drawing Figures

SYSTEM AND METHOD FOR CONTROLLING AIR CONDITIONING SYSTEMS

The present invention relates generally to air conditioning systems and pertains, more specifically, to a control system and method for controlling the refrigeration unit of an air conditioning system to maintain a desired comfort level in a particular building environment.

Air conditioning systems currently in service for cooling air within a building utilize refrigeration units for cooling a heat transfer medium, usually water, which is circulated throughout the building to remove heat from the air within the envelope defined by the building, referred to herein as the building environment. Controllers for such air conditioning systems usually detect the temperature of the water as it leaves the refrigeration unit (the chilled water temperature) and operate the refrigeration unit to tend to keep the chilled water temperature at a selected predetermined temperature, known as the set point. Assuming that the air conditioning system is operating at an ideal state of equilibrium, the chilled water temperature will remain at the set point and the conditions within the building will be maintained at a desired comfort level. Deviations from the set point will result in the generation of a control signal which operates a control device for increasing or reducing the transfer of heat from the chilled water as the water circulates through the refrigeration unit so as to tend to return the system to equilibrium. Thus, in such systems, the chilled water temperature becomes an index for determining the conditions within the building environment and the operating level of the refrigeration unit, and any changes in these conditions and operating levels must first be reflected in the chilled water temperature before the controller will generate a control signal which will change the operating level of the refrigeration unit. Such control arrangements are known as feedback control systems. Because there can be a considerable time lag between a change in conditions within the building environment and a corresponding change in the chilled water temperature, or a change in the operating level of the refrigeration unit, the ability of the air conditioning system to respond quickly to external changes is limited, leading to a loss in effectiveness and inefficient operation.

It has been suggested that air conditioning systems can be made more effective and more efficient by an arrangement of controls which is responsive to various conditions within the building environment, such as room air temperature, radiation temperature, or relative humidity, to automatically readjust the set point of the chilled water and thereby increase the responsiveness of the air conditioning system to changes in conditions within the building environment. While such an arrangement can improve the effectiveness and the efficiency of the air conditioning system, there still remains a considerable time lag between changes in conditions and the appropriate compensation for such changes.

In order to improve the operating effectiveness and the energy efficiency of an existing air conditioning system, the present invention provides a control system and method which detects changes in various conditions that will affect the comfort level within the building and then acts immediately to generate at least one control signal which will change the operation of the refrigeration unit in anticipation of the change that can be expected in the comfort level, as a result of the detected changes in the various conditions affecting the comfort level. In order to anticipate such changes effectively, the control system and method of the invention take into account the dynamic characteristics of the particular building environment and the particular refrigeration unit of any given installation. Thus, the present invention recognizes that changes in the comfort level within a building environment can be predicted from the detection of changes in those conditions which ordinarily effect a change in the comfort level, based upon the known dynamic characteristics of the building environment. Likewise, the response of a particular refrigeration unit is based upon the dynamic characteristics of the unit. By taking into account both the dynamic characteristics of the building environment and the dynamic characteristics of the refrigeration unit in a particular installation, a given air conditioning system can be made more effective and can operate at greater efficiency. Since the dynamic characteristics of any particular building environment and any particular refrigeration unit can be determined empirically, the present invention enables the utilization of a control system and method in connection with existing installations for increasing the effectiveness and the efficiency of such installations.

It is an object of the present invention to provide a system and method for controlling air conditioning systems so as to use the minimum amount of energy input to maintain a desired comfort level in a given building environment.

Another object of the invention is to provide a system and method for controlling air conditioning systems so as to reduce the energy consumption in an existing installation.

Still another object of the invention is to provide a system and method for controlling air conditioning systems such that the refrigeration unit of the system is more stable in operation and maintains conditions within a building environment with less deviation from the desired comfort level.

Yet another object of the invention is to provide a system and method for controlling air conditioning systems such that the energy load requirement is more stable, thereby enabling a more efficient energy supply.

A further object of the invention is to provide a system and method for controlling air conditioning systems whereby existing installations may be adapted readily to more effective and efficient operation, without requiring replacement of the refrigeration unit of the existing installation.

A still further object of the invention is to provide a system and method for controlling air conditioning systems utilizing presently available control components in an effective and economical arrangement.

Yet a further object of the invention is to provide a system and method for controlling air conditioning systems, which control system and method can be applied to a wide variety of installations utilizing different types of machinery, without requiring elaborate modifications.

The above objects, as well as further objects and advantages, are attained by the present invention, which may be described briefly as a control system for a refrigeration unit of an air conditioning system operating in connection with a given building environment so as to establish conditions providing a desired comfort level within the building environment, the refrigeration unit and the building environment each having predetermined dynamic characteristics, the control system comprising: energy input control means for controlling the energy supplied to the refrigeration unit; first detector means for detecting the output of the refrigeration unit and providing a first signal indicative of the output; first compensating means responsive to the first signal for providing a control signal compensated for the predetermined dynamic characteristics of the refrigeration unit; second detector means for detecting a change in at least one condition indicative of a change in the conditions affecting the comfort level within the building environment and providing a second signal; and second compensating means responsive to the control signal and to the second signal for providing a further control signal to the energy input control means, the further control signal being compensated for the predetermined dynamic characteristics of the building environment, such that the further control signal will anticipate further change in the conditions within the building environment and will operate the energy input control means to counter the anticipated further change and tend to maintain the desired comfort level.

The invention further contemplates a method for controlling a refrigeration unit of an air conditioning system operating in connection with a given building environment so as to establish conditions providing a desired comfort level within the building environment, the refrigeration unit having energy input control means for controlling the energy supplied to the refrigeration unit, and the refrigeration unit and the building environment each having predetermined dynamic characteristics, the method comprising the steps of: detecting the output of the refrigeration unit and providing a first signal indicative of the output; providing, in response to the first signal, a control signal compensated for the predetermined dynamic characteristics of the refrigeration unit; detecting a change in at least one condition indicative of a change in the conditions affecting the comfort level within the building environment and providing a second signal indicative of the detected change; and providing, in response to the control signal and to the second signal, a further control signal to the energy input control means, the further control signal being compensated for the predetermined dynamic characteristics of the building environment, such that said further control signal will anticipate further change in the conditions within the building environment and will operate the energy input control means to tend to counter the anticipated further change and maintain the desired comfort level.

The invention will be more fully understood, while still further objects and advantages will become apparent, in the following detailed description of a preferred embodiment of the invention illustrated in the accompanying drawing, in which.

Figure 1:
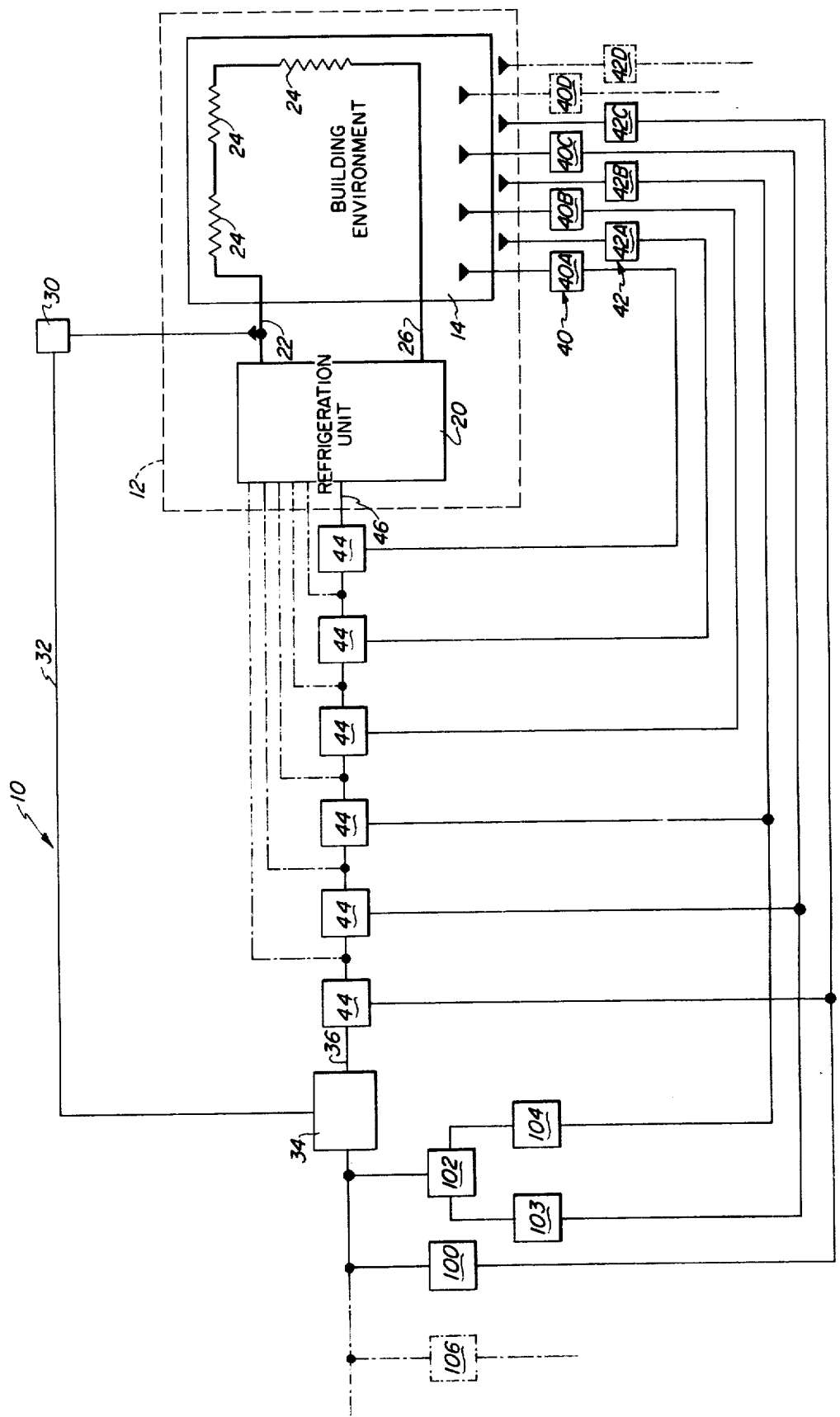
FIG. 1 is a block diagram illustrating a control system and method constructed and capable of operation in accordance with the invention.

Referring now to the drawing, and especially to FIG. 1 thereof, a control system constructed in accordance with the invention is shown at 10. Control system 10 is arranged to control an air conditioning system 12 operating in connection with a given building environment 14 so as to establish within the building environment 14 conditions providing a desired comfort level.

Air conditioning system 12 includes a refrigeration unit 20 which provides a heat transfer medium, namely, chilled water, through supply line 22 to the building environment 14 wherein the chilled water passes through heat transfer devices 24 which remove heat and humidity from within the building environment 14. The chilled water is returned to the refrigeration unit 20 through a return line 26, the temperature of the chilled water having been raised by virtue of the heat transferred from the building environment 14.

Under equilibrium conditions, the chilled water leaves the refrigeration unit 20 at a predetermined temperature, known as the set point, and returns at some higher temperature determined by how much heat is transferred from the building environment 14 to the chilled water. The refrigeration unit 20 then removes the heat from the return chilled water and lowers the temperature of the chilled water to the set point. However, air conditioning systems seldom operate at equilibrium conditions. Changes occur continually in conditions within the building environment 14, and the operation of the air conditioning system 12 must be controlled to compensate for such changes so as to tend to maintain these conditions at a desired comfort level. Control system 10 takes into account the dynamic characteristics of the building environment 14 and the dynamic characteristics of the refrigeration unit 20 so as to minimize any departures from the desired comfort level as a result of changing conditions.

The building environment 14 is the envelope within which people and machinery are placed when in the building and in connection with which air conditioning system 12 operates. The conditions within the building environment which determine the comfort level within the building environment are temperature and humidity. It is the function of the air conditioning system 12 to maintain the temperature and humidity within the limits required by the desired comfort level. The temperature and humidity within the building environment 14 are affected by a number of variables, some of which are related to what transpires within the building and others of which are related to what is occurring outside the building. Thus, conditions within the building environment are affected by internal variables, such as the number and activity of people within the building and the number of machines and other apparatus operating within the building, as well as by external variables, such as outside air temperature, outside humidity, sun load and wind velocity. All of these variables will affect the conditions within the building environment, and changes in the variables will be reflected as changes in those conditions governing the comfort level. The time between a change in one of these variables and a corresponding change in a condition affecting the comfort level is a function of the building itself and is determined primarily by the design and construction of building structure and the manner in which the building is utilized. Thus, for any given building structure, the ability of the building environment to respond to changes in internal and external variables can be determined. Usually, for an existing building, such a determination is made empirically. What is determined are the dynamic characteristics of the building environment; that is, the time frame within which conditions within the building environment will change as a result of changes in the above-enumerated internal and external variables.

The variables themselves may be monitored for changes by detecting various conditions. Thus, internal variables can be monitored by detecting changes in the air temperature within the building environment, changes in humidity, and changes in electrical load or energy load supplied in other forms to the building. External variables can be monitored by detecting changes in outside temperature, outside humidity, sun position and sunlight intensity (sun load), and wind speed and direction (wind velocity).

The refrigeration unit 20 also exhibits dynamic characteristics which are a function of the design and construction of the unit. Broadly, the dynamic characteristics of the refrigeration unit determine how quickly and to what extent a change in an input control setting of the machine will result in a change in the output; for example, how quickly will a change in an energy input control setting be reflected in a corresponding change in the temperature of the chilled water supplied by the refrigeration unit. Further examples of input controls are discussed more fully hereinafter. Again, the dynamic characteristics of a given refrigeration unit can be determined empirically.

Control system 10 detects external and internal variables which can affect conditions within the building environment and monitors the time rate of change of these variables. Based upon the predetermined dynamic characteristics of the building environment 14 and the predetermined dynamic characteristics of the refrigeration unit 20, control system 10 provides at least one control signal which is compensated to anticipate changes in the conditions within the building environment to be expected as a result of the detected changes in the variables and further compensated to operate the refrigeration unit 20 in such a manner as to tend to counter such changes in conditions and maintain the desired comfort level.

Thus, control system 10 includes a first detector means in the form of sensor 30 for detecting the output of the refrigeration unit 20. In this instance, sensor 30 detects the temperature of the chilled water provided by the refrigeration unit 20. A first signal is provided by sensor 30, indicative of the output of the refrigeration unit 20, and is supplied, via line 32, to a first compensating means in the form of dynamic compensator 34. Compensator 34 is a commercially available control component, one such component being available from The Foxboro Company, under the designated Spec. 200, model number 2AC−2AX+A5. Compensator 34 includes control devices for controlling gain (proportional band, either fixed or variable), integral action, and derivative action (or velocity error change). The control devices are programmed on the basis of the predetermined dynamic characteristics of the refrigeration unit 20 so as to provide a control signal, at line 36, compensated for those dynamic characteristics, in response to the first signal provided by sensor 30.

Second detector means is illustrated in the form of a plurality of detectors 40 and a plurality of detectors 42. Detectors 40 and 42 are arranged to detect changes in conditions indicative of an ensuing change in a condition affecting the comfort level within the building environment 14, each detector providing a second signal. Detectors 40 are placed so as to detect changes in internal conditions; for example, detector 40A detects the air temperature within the building environment 14, detector 40B detects the inside humidity and detector 40C detects the electrical load. Detectors 42 are placed so as to detect changes in external conditions; for example, detector 42A detects the air temperature outside the building environment 14, detector 42B detects outside humidity and detector 42C detects sun load. Additional external conditions, such as wind velocity, can be detected by further detectors, as indicated by further detector 42D, shown in phantom. Likewise, additional internal conditions, such as radiation temperature, can be detected by further detectors, as indicated in phantom at 40D.

Each detector 40 and 42 is connected to a corresponding second compensating means, in the form of dynamic compensator 44, so that the second signal provided by a detector 40 or 42 is received by a corresponding compensator 44. Compensator 44 is a commercially available control component, one such component being available from The Foxboro Company, Foxboro, Massachusetts, under the designated Spec. 200, model number 2AC−2AX+A2. Compensator 44 includes control devices for controlling gain (proportional band, either fixed or variable) and for error detection. Because the dynamic characteristics of the building environment 14 ordinarily differ from the dynamic characteristics of the refrigeration unit 20, each compensator 44 is programmed on the basis of the dynamic characteristics of the building environment 14 so as to provide a further control signal, in response to the first control signal and in response to the second signal, the further control signal being compensated for the predetermined dynamic characteristics of the building environment. The further control signal is supplied to the refrigeration unit 20, via line 46, to operate the refrigeration unit, based upon the known dynamic characteristics of the refrigeration unit, in such a way as to anticipate further change in the conditions within the building environment, based upon the known dynamic characteristics of the building environment, to tend to maintain the desired comfort level.

The gain settings in compensator 44 ordinarily are fixed by the predetermined dynamic characteristics of the building environment 14. Where these characteristics may be such as to require the gain to vary under various load conditions on the building environment 14, the gain can be varied automatically by incorporating a variable gain adaptive control component, such as The Foxboro Company, model 2AC−2AX+MUL.

Any number of detectors 40 or 42 may be utilized, each in connection with a corresponding, appropriately programmed compensator 44. For purposes of illustration, only three detectors 40 and three detectors 42 are shown with corresponding compensators 44, but it is to be understood that each detector can be utilized in connection with a corresponding compensator.

Present air conditioning systems basically utilize one of two types of refrigeration units, designated generally as absorbers and centrifugal chillers. Control system 10 may be utilized in connection with either an absorber or a centrifugal chiller.

Figure 2:
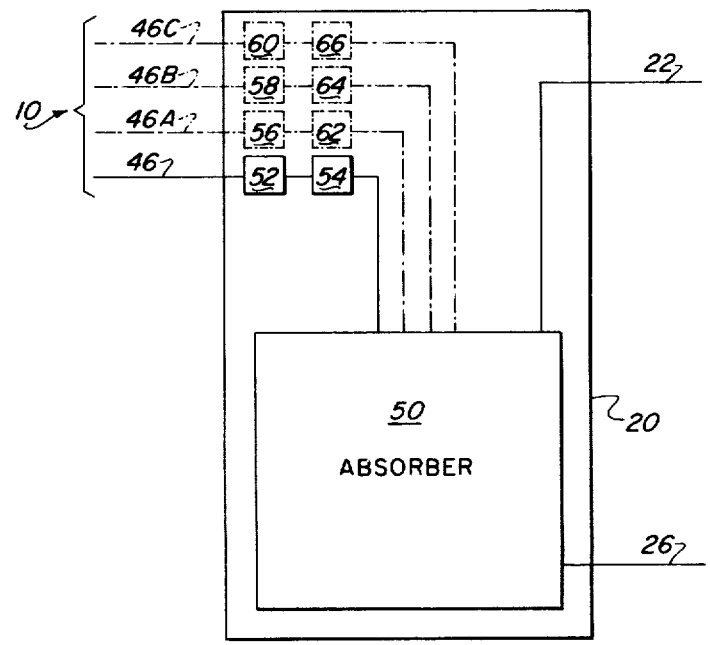
FIG. 2 is a diagram illustrating the use of the control system and method of FIG. 1 in connection with one particular type of refrigeration unit.

Turning now to FIG. 2, refrigeration unit 20 is seen to comprise an absorber 50. Absorber 50 can be controlled through any one or combination of control devices, all of which will affect the operation of the absorber 50 and, consequently, the output. Thus, the further control signal available at line 46 of control system 10 can be supplied to a valve positioner 52 which, in turn, operates a steam valve 54 to control the input of energy to the absorber 50. Likewise, additional lines, as for example lines 46A, 46B and 46C can supply further control signals to any of the valve positioners 56, 58 or 60, which, in turn, will operate, respectively, a solution concentrator capacity flow control valve 62, an absorber spray capacity control valve 64, and a condition cooling water control valve 66. Each of these constitutes an input control means operated under the influence of the control system 10.

Figure 3:
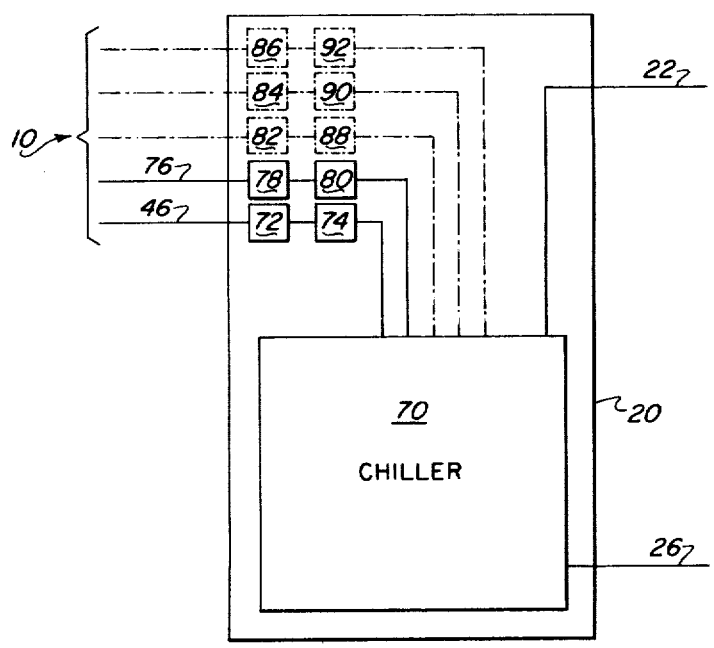
FIG. 3 is a diagram illustrating the use of the control system and method of FIG. 1 in connection with another type of refrigeration unit.

Referring to FIG. 3, refrigeration unit 20 is seen to comprise a centrifugal chiller 70. In this instance, the further control signal available at line 46 is supplied to a positioner 72 which, in turn, operates the turbine governor or the steam valve 74 to control the operation of the chiller. A still further control signal can be supplied via another line 76 to a positioner 78 for controlling the compressor vane control dampers 80. Additional further control signals may be supplied to further positioners 82, 84 and 86 for controlling, respectively, a hot gas bypass control valve 88, an economizer valve 90, and a condition cooling water control valve 92. Thus, control system 10 may be used in connection with the operation of input control means for either an absorber or a centrifugal chiller.

Returning now to FIG. 1, control system 10 optionally includes compensators for minimizing the energy consumption of air conditioning system 12. Energy minimizing compensators 100, 102, 103 and 104 are provided in order to change the set point of the chilled water in response to changes in the conditions detected by selected detectors 40 and 42. Further compensators, such as compensator 106, may be added as required. Should the detectors 40 and 42 detect a relatively large change in conditions requiring a significantly large change in the temperature of the chilled water, the energy minimizing compensators 100, 102, 103 and 104 are available for effecting the necessary change in set point.

Compensators 100, 102, 103 and 104 are commercially available control components sold by The Foxboro Company, under the model number 2AC−2AX-+A2. The compensators include a gain control (fixed or variable) and a trigger level control. The gain control serves to change the set point in proportion to the signal provided by the corresponding detector 40 or 42. The trigger level control determines the point above which or, alternately, below which the compensators cease to function. The compensators are programmed based upon the knowledge that the temperature of the chilled water need not be as low on cool or dry days as on hot and humid days. Therefore, the set point can be modified in accordance with the conditions detected by selected detectors 40 and 42, thereby minimizing energy consumption.

It will be apparent from the above detailed description that the control system and method of control of the present invention will accomplish a reduction in energy consumption by either an absorber or a centrifugal chiller type refrigeration unit by varying the primary motive energy input (steam, in the case of an absorber, and vane position, in the case of a centrifugal chiller) and secondary capacity control devices (a diverter valve in an absorber and turbine speed in a centrifugal chiller). The control system and method provides the ability to sense, anticipate and correct for the various changes in environmental conditions so as to attain the appropriate flow of chilled water with a minimum of delay and with a more even, more effective use of input energy.

The control system and method allow the use of signals generated by a plurality of detectors serving to sense a variety of condition changes and enables a selection of those signals indicative of conditions to which the building environment is most sensitive in response to cooling load changes. The control system and method allow closer matching of the refrigeration unit to the building environment for more efficient operation in accommodating these cooling load changes.

The control parameters are modified by information pertaining to the dynamic characteristics of the refrigeration unit and the dynamic characteristics of the building environment. The control system utilizes this information, together with information pertaining to changes in variables which will affect those conditions which determine the comfort level in order to anticipate the need for a change in the energy input and to begin making that change in advance of the occurrence of the predicted changes in the comfort level. Thus, the detectors will sense a change in one or more of the variables which eventually will affect the comfort conditions and, based upon the known dynamic characteristics of the refrigeration unit and the building environment, the control system begins immediately to reposition the primary motive energy input means, as well as any secondary capacity control devices. In this manner, the present control system eliminates the inherent time lag found in conventional control systems between a change in comfort conditions and a machine response to compensate for such a change. The ability to anticipate changes in the conditions which determine the comfort level enables operation of the refrigeration unit essentially in parallel with cooling load swings instead of chasing or following the cooling load changes.

It is to be understood that the above detailed description of an embodiment of the invention is provided by way of example only. Various details of design and construction may be modified without departing from the true spirit and scope of the invention as set forth in the appended claims.

The embodiments of the invention in which an exclusive property or privilege is claimed are defined as follows:

1. A control system for a refrigeration unit of an air conditioning system operating in connection with a given building environment so as to establish conditions providing a desired comfort level within the building environment, the refrigeration unit and the building environment each having predetermined dynamic characteristics, said control system comprising:
   energy input control means for controlling the energy supplied to the refrigeration unit;
   first detector means for detecting the output of the refrigeration unit and providing a first signal indicative of the output;
   first compensating means responsive to the first signal for providing a control signal compensated for the predetermined dynamic characteristics of the refrigeration unit;
   second detector means for detecting a change in at least one condition indicative of a change in the conditions affecting the comfort level within the building environment and providing a second signal; and
   second compensating means responsive to the control signal and to the second signal for providing a further control signal to the energy input control means, the further control signal being compensated for the predetermined dynamic characteristics of the building environment, such that said further control signal will anticipate further change in the conditions within the building environment and will operate the energy input control means to counter the anticipated further change and tend to maintain the desired comfort level.

2. The invention of claim 1 wherein the first compensating means is responsive to the time rate of change of the first signal to provide the control signal.

3. The invention of claim 1 or 2 wherein the second compensating means is responsive to the time rate of change of the second signal to provide the further control signal.

4. The invention of claim 1 wherein the second detector means includes a plurality of detectors for detecting a plurality of conditions.

5. The invention of claim 4 wherein the second compensating means includes a plurality of dynamic compensators corresponding to the plurality of detectors such that each dynamic compensator receives a signal from a corresponding detector.

6. The invention of claim 5 wherein the refrigeration unit includes further control means and the second compensating means provides at least one still further control signal for operating said further control means.

7. The invention of claim 4, 5 or 6 wherein at least one of the detectors detects an external condition outside of the building environment, which external condition will affect the comfort level within the building environment in accordance with the predetermined dynamic characteristics of the building environment.

8. The invention of claim 4, 5 or 6 wherein at least one of the detectors detects an internal condition within the building environment, which internal condition will affect the comfort level within the building environment in accordance with the predetermined dynamic characteristics of the building environment.

9. The invention of claim 7 wherein at least one of the detectors detects an internal condition within the building environment, which internal condition will affect the comfort level within the building environment in accordance with the predetermined dynamic characteristics of the building environment.

10. The invention of claim 7 wherein the plurality of detectors includes detectors for detecting at least one of the following external conditions: air temperature, air humidity, sun load, and wind velocity.

11. The invention of claim 8 wherein the plurality of detectors includes detectors for detecting at least one of the following internal conditions: air temperature, air humidity, radiation temperature and electrical load.

12. The invention of claim 9 wherein the plurality of detectors includes:
detectors for detecting at least one of the following external conditions: air temperature, air humidity, sun load, and wind velocity; and
detectors for detecting at least one of the following internal conditions: air temperature, air humidity, radiation temperature and electrical load.

13. A method for controlling a refrigeration unit of an air conditioning system operating in connection with a given building environment so as to establish conditions providing a desired comfort level within the building environment, the refrigeration unit having energy input control means for controlling the energy supplied to the refrigeration unit, and the refrigeration unit and the building environment each having predetermined dynamic characteristics, said method comprising the steps of:
detecting the output of the refrigeration unit and providing a first signal indicative of the output;
providing, in response to the first signal, a control signal compensated for the predetermined dynamic characteristics of the refrigeration unit;
detecting a change in at least one condition indicative of a change in the conditions affecting the comfort level within the building environment and providing a second signal; and
providing, in response to the second signal, a further control signal to the energy input control means, the further control signal being compensated for the predetermined dynamic characteristics of the building environment, such that said further control signal will anticipate further change in the conditions within the building environment and will operate the energy input control means to counter the anticipated further change and tend to maintain the desired comfort level.

14. The invention of claim 13 wherein the control signal is provided in response to the time rate of change of the first signal.

15. The invention of claim 13 or 14 wherein the further control signal is provided in response to the time rate of change of the second signal.

16. The invention of claim 13 wherein a plurality of conditions are detected.

17. The invention of claim 16 wherein the refrigeration unit includes further control means and the method includes the step of providing at least one still further control signal for operating said further control means.

18. The invention of claim 16 or 17 wherein at least one of the detected conditions is an external condition outside of the building environment, which external condition will affect the comfort level within the building environment in accordance with the predetermined dynamic characteristics of the building environment.

19. The invention of claim 16 or 17 wherein at least one of the detected conditions is an internal condition within the building environment, which internal condition will affect the comfort level within the building environment in accordance with the predetermined dynamic characteristics of the building environment.

20. The invention of claim 18 wherein at least one of the detected conditions is an internal condition within the building environment, which internal condition will affect the comfort level within the building environment in accordance with the predetermined dynamic characteristics of the building environment.

21. The invention of claim 18 wherein the plurality of detected conditions includes at least one of the following external conditions: air temperature, air humidity, sun load, and wind velocity.

22. The invention of claim 19 wherein the plurality of detected conditions includes at least one of the following internal conditions: air temperature, air humidity, radiation temperature and electrical load.

23. The invention of claim 20 wherein the plurality of detected conditions includes:
at least one of the following external conditions: air temperature, air humidity, sun load, and wind velocity; and
at least one of the following internal conditions: air temperature, air humidity, radiation temperature and electrical load.

* * * * *